May 27, 1958 P. SOLTESZ ET AL 2,836,321

APPLIANCE FOR USE WITH AN INFANT'S FEEDING BOTTLE

Filed April 30, 1957 3 Sheets-Sheet 1

INVENTORS
Pablo Soltesz and Nicolas Tannenbaum
BY Edward V. Connors

May 27, 1958 P. SOLTESZ ET AL 2,836,321

APPLIANCE FOR USE WITH AN INFANT'S FEEDING BOTTLE

Filed April 30, 1957 3 Sheets-Sheet 2

INVENTORS
Pablo Soltesz and Nicolas Tannenbaum
BY
Edward P. Connors

May 27, 1958 P. SOLTESZ ET AL 2,836,321

APPLIANCE FOR USE WITH AN INFANT'S FEEDING BOTTLE

Filed April 30, 1957 3 Sheets-Sheet 3

INVENTORS
Pablo Soltesz and Nicolas Tannenbaum
BY Edward V. Connors

United States Patent Office 2,836,321

Patented May 27, 1958

2,836,321

APPLIANCE FOR USE WITH AN INFANT'S FEEDING BOTTLE

Pablo Soltesz and Nicolas Tannenbaum, Montevideo, Uruguay

Application April 30, 1957, Serial No. 656,084

Claims priority, application Switzerland November 21, 1956

14 Claims. (Cl. 215—11)

The present invention relates to an appliance for use with an infant's feeding bottle, having a sucking device which can be placed tightly in the mouth of the bottle in two different positions by the agency of a part removed from the sucking end of the sucking device and in particular lying opposite to the sucking end; in the one position the contents of the bottle can flow through a channel passing through the sucking device, and in the other position the latter can be used as a tight closure for the bottle.

Appliances of the kind in which the sucking devices have a sucking part or teat consisting, for example, of rubber, with a wide flange opposite to the sucking end, are already known. When in use, this flange is placed on the mouth of the bottle and then pressed against the latter by means of a clamping nut which can be screwed on to a screw thread on the outside of the neck of the bottle. The teat is thus tightly connected with the bottle. It is thereby possible to place the teat either with the sucking end projecting outwards through the opening in the clamping nut or on the mouth of the bottle with the sucking end extending into the neck of the bottle, the sucking device serving in the first case to feed the child and in the second case as the bottle stopper. In the second case a disc is inserted between the clamping nut and the teat which prevents the contents of the bottle from flowing out through the teat. This known appliance consequently consists of three separate parts, of which only two are used when it is in use and which must always be put together in another opposite position for the purpose of use for the time being. In so doing, the teat must of course also be touched in the case of each arrangement of the appliance for a specific purpose, which is unhygienic.

These disadvantages can be avoided in the appliance according to the present invention by constructing the said part of the sucking device which can be placed tightly on the mouth of the bottle, as a fixing member, with which the teat of the sucking device is connected in the same way in both the positions mentioned, and which fixing member can be tightly connected with the mouth of the bottle in two opposite positions. Each separate assembling of the appliance and the unhygienic touching of the teat which is combined therewith is thus avoided. If the appliance has been used as a stopper, then the teat in particular is completely covered by the feeding liquid, so that, when the known appliance is prepared for feeding the child, the hands get quite dirty. This disadvantage also is largely avoided in the appliance according to the present invention, because the arrangement requires no alteration when passing from one to the other purpose of use.

The invention also relates to a use of the appliance just described as a sucking bag or infant's pacifier separate from the bottle when the channel is closed in at least one place. It is thus possible to use the appliance according to the invention in three different positions or states for three different purposes.

An example of construction and different variants of the appliance according to the invention are represented on the drawing.

Figure 1:
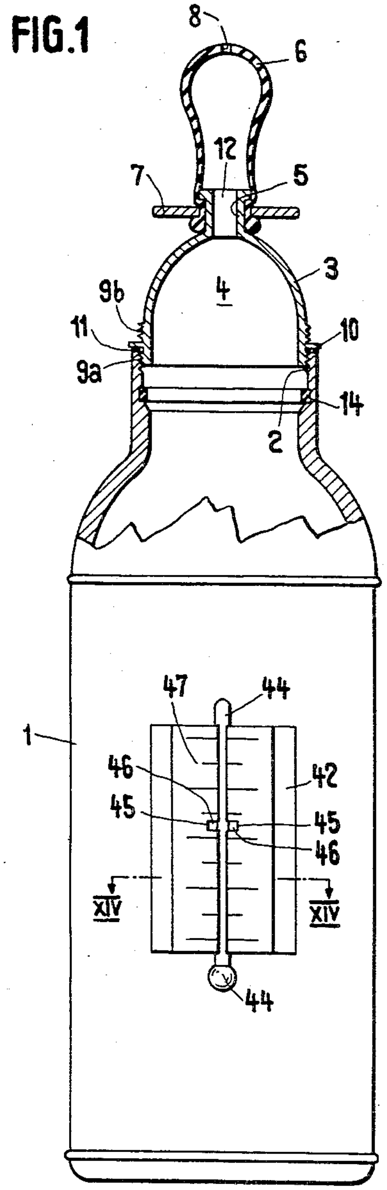
Figure 1 shows a feeding bottle with the appliance placed thereon in the opposite position.

Figure 1 shows a feeding bottle 1, the mouth of which is provided with an inside screw thread 2. The bottle may preferably consist of an unbreakable flexible material, e. g. plastic, which itself has good sealing properties. The appliance according to the invention, partly depicted in Figure 1, has a dome-shaped receptacle 3 having a hollow space 4 and an outflow connection 5. The actual teat 6, consisting of rubber for example, is placed on the connecting piece 5 and is held tightly there by a pierced disc 7. The teat 6 has an outflow opening 8 at its free end.

The parts 3 to 7 represent the actual sucking device, which in Figure 1 is screwed by the outside part **9*a* of a screw thread into the inside screw thread 2 of the bottle 1. The threaded part 9*a* is separated from a coaxial threaded part 9*b* by an annular flange 10, which in the position shown in Figure 1 presses a sealing ring 11 held between it and the threaded part 9*a* against the edge of the mouth of the bottle, and therewith ensures a tight connection between the part 3 and the bottle 1. By the hollow space 4, the bore 12 of the connecting piece 5 and the hollow space of the teat 6 there is formed a channel passing through the sucking device in the longitudinal direction, through which the contents of the feeding bottle can flow to the outflow opening 8 of the teat 6. In the position shown in Figure 1, the appliance according to the invention can thus be used with the bottle 1** in the usual way for feeding a child.

Figure 2:
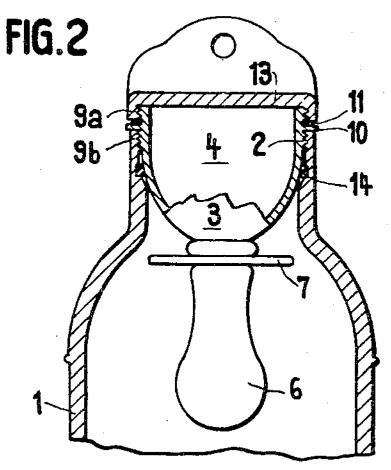

Figure 2 shows the sucking device with the threaded part **9*b* screwed into the inside screw thread 2 of the mouth of the bottle, so that now the teat 6 of the sucking device extends into the feeding bottle 1. A cover 13 of wing-nut type is put on by means of the threaded part 9*a* of the receptacle 3, the lower edge of the cover resting on the sealing ring 11, and therefore the flowing of liquid out through the opening of the receptacle 3** is impossible. In this position the dome-shaped surface of the receptacle 3 rests on a sealing ring 14 inserted in the neck of the bottle and therefore also prevents any liquid from leaving the bottle between the outer wall of the receptacle 3 and the inner wall of the neck of the bottle. The appliance consisting of the sucking device and the cover 13, in the position shown in Figure 2, also acts as a closing member for the feeding bottle 1, so that the bottle and its contents, and at the same time the immediately usable sucking device, can easily be transported, which is very desirable when on outings or travelling with the child. It is also possible in some cases to use the appliance without the cover 13, as a stopper for the bottle, when the teat 6 prevents to a sufficient extent the escape of liquid into the hollow space 4. A separate stopper for the feeding bottle is unnecessary in this case and the teat 6 of the sucking device is entirely inside the bottle and protected from contamination. If the bottle is now required to be used for feeding the child, the cover 13 of the receptacle 3 is first unscrewed (provided it was put on) and then the receptacle 3 is unscrewed from the mouth of the bottle and screwed on again in the position shown in Figure 1. With this, the bottle is now ready for use.

The sucking device shown in Figure 2 with the cover put on, however, can also be used separately from the bottle 1 as a sucking bag, in which case the sucking of air through the latter is impossible because the channel through the sucking device is sealed by tightly put on cover 13.

Figure 3:
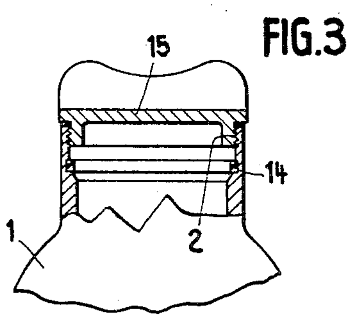
Figure 3 illustrates the feeding bottle in a further state of use.

If, when the appliance is used as a sucking bag, the bottle 1 is also required to be used for the transport of a feeding liquid, a further wing nut-shaped cover 15 for the appliance according to the invention, together with a sealing ring 16, can be used for closing the bottle as shown in Figure 3. One and the same screw thread 2 in the neck of the bottle consequently serves both for fixing the sucking device in two positions and for securing the cover 15.

The sucking bag of the appliance according to the invention which is shown in Figure 2 inserted in the mouth of the bottle 1, can also be used of itself as a small feeding bottle, however, if the food is poured into the hollow space 4 of the receptacle 3 serving as a reservoir, and the cover 13 is then replaced. In the same way, of course, this fillable sucking bag can also be used for giving medicine, liquid or viscous sweets or like substances.

Figure 4:
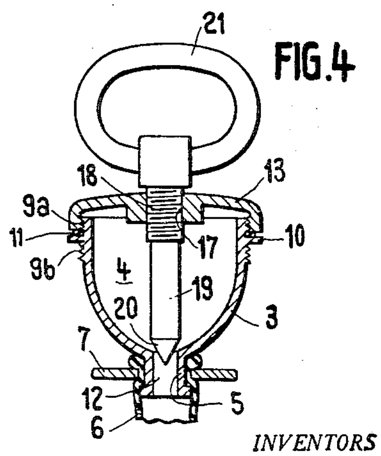
Figure 4 shows a partial section through a variant of the appliance.

It is desirable to regulate the flow through the channel of the appliance, both when it is used with the feeding bottle as a sucking device and also when it is used as a sucking bag. With the appliance according to the invention, it is now possible to use the means mentioned for closing the channel of the sucking device also at the same time as a means for regulating the flow. A first embodiment of such a combined closing and regulating device is shown in Figure 4. The closing cover 13 of the receptacle 3 is provided with a central threaded bore 17, into which the threaded part 18 of an adjusting bolt 19 is inserted. The conical point 20 of the adjusting bolt 19 projects into the channel 12 of the connecting piece 5, and can be moved therein in the axial direction when the threaded part 18 of the adjusting bolt 19 is turned in the threaded bore 17 of the cover 13 by means of a handle 21. It is thereby possible to screw the adjusting bolt 19 completely down so that its adjusting cone 20 seats on the top edge of the mouth of the channel 12 and therefore prevents any flow through the sucking device. By screwing the adjusting bolt 19 upwards, all the different adjustment positions can be attained for adjusting to the desired flow from the receptacle 3 into the teat 6 of the sucking device.

The appliance shown in Figure 4 with the cover 13 put on, i. e. with an effective regulating device, cannot be used with the bottle 1 in the way represented in Figure 1, because the receptacle 3 cannot be screwed into the mouth of the bottle when the cover 13 is on. The appliance according to Figure 4 therefore only permits regulation of the flow when it is used as a fillable sucking bag separate from the bottle 1. It is now desirable, however, to have the possibility of regulation both when it is used with the bottle 1 as a sucking device and also when used as a sucking bag.

Figure 5:
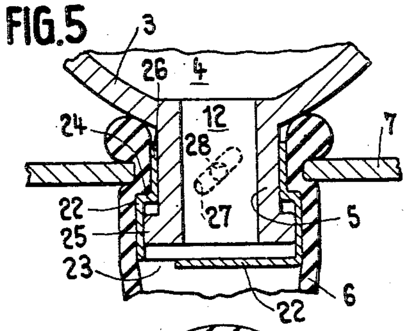
Figure 5 shows an enlarged partial section through a further variant of the appliance.
Figure 6:
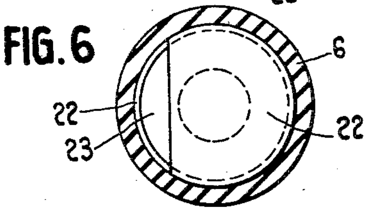
Figure 6 shows a view of Figure 5 from below with the teat removed.

Such a regulating device which can always be used is shown, for example, in Figures 5 and 6. In the appliance represented in these figures, there is placed between the teat 6 and the connecting piece 5 a sleeve 22, which has in its base an opening 23 in the shape of a segment of a circle. The sleeve 22 grips the connecting piece 5 beyond its lower flange 25 with a shoulder 24 and is thus ensured against falling off the piece 5. In the upper cylindrical part 26 of the sleeve 22 which rests on the connecting piece 5, is provided an oblique slot 27, in which engages a cam 28 of the connecting piece 5.

By rotating the disc 7, which turns with it the teat 6 and therefore the sleeve 22, the latter can now be axially displaced, because the cam 28 engaging in the control slot 27, with each rotation of the sleeve 22 also causes an axial displacement of the same. This axial displacement of the sleeve 22 can take place so far upwards from the central regulating position shown that the bottom of the sleeve 22 rests on the lower face of the connecting piece and closes the channel 12. It is thus possible with this device to stop entirely the flow through the sucking device and, within certain limits, to retulate it continuously.

Figure 7:
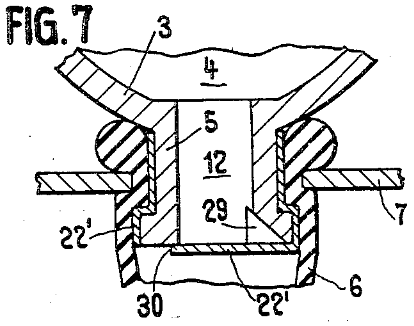
Figures 7 and 8 show representations corresponding to Figures 5 and 6 of a further variant.
Figure 8:
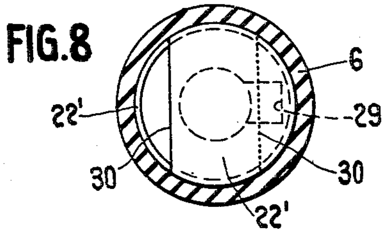

Figures 7 and 8 show a regulating device similar to that of Figures 5 and 6, in which, however, a sleeve 22′ is placed on the connecting piece 5 so that it is only able to rotate but is not axially displaceable. The channel 12 of the connecting piece 5 has a laterial eccentric broadened part 29 at its lower end.

In the turned position of the sleeve 22′ shown in Figures 7 and 8, the channel 12 and its broadened part 29 are completely covered by the bottom of the sleeve 22′, as Figure 8 clearly shows, so that the flow through the sucking device is stopped. If the sleeve 22′ is rotated about 180°, however, the edge 30 of its opening reaches the position shown in Figure 8 by the dotted line, in which a portion of the broadened part 29 is free, so that the feeding liquid can flow through. With a suitable intermediate position of the sleeve 22′, any desired continuously controllable rates of flow can be obtained.

The sleeves 22 or 22′ respectively could be slotted in the axial direction in order to facilitate the fitting of the regulating device.

Figures 9, 10, 11, 12, 13, 14:
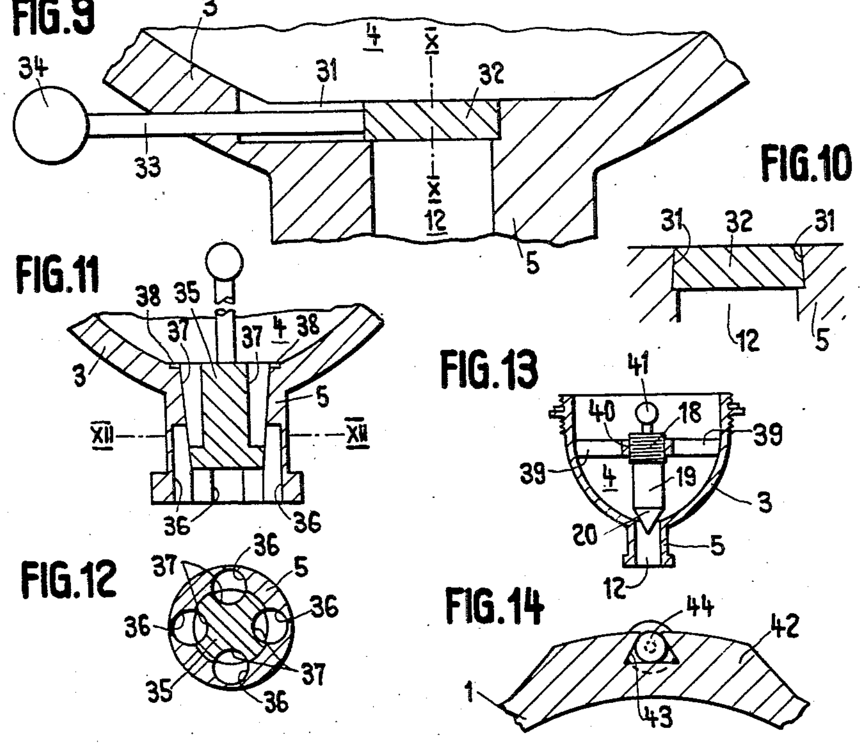
Figure 9 shows an enlarged partial section through a further variant of the appliance according to the invention.
Figure 10 shows a section along the line X—X in Figure 9.
Figure 11 shows an enlarged partial section through a further variant of the appliance.
Figure 12 shows a section along the line XII—XII in Figure 11.
Figure 13 shows a section through a further variant of the appliance.
Figure 14 shows an enlarged section along the line XIV—XIV in Figure 1.

Figures 9 and 10 show a further possibility of how the flow through the sucking device can be continuously regulated and stopped. According to Figures 9 and 10, a slightly dovetailed groove 31 is provided at the base of the receptacle 3, and in it slides a correspondingly shaped slide bar 32, as far as possible without play. An adjusting rod 33 is attached to the slide bar 32 and projects outwardly through the wall of the receptacle 3, and is provided with a control knob 34 on its outer end. The slide bar 32 can be pushed back and forth in the groove 31 by means of the control knob 34 so as to reach the closed position shown in Figure 9 or any desired control position.

The regulating device may advantageously also be constructed in the form of a friction cock, in which case, for example, according to Figure 11, the channel through the connecting piece 5 is made slightly conical, in order to accommodate a likewise slightly conical friction cock 35. Grooves 36 are provided in the lower part of the bore of the connecting piece and grooves 37 are provided in the upper part of the friction cock 35, the grooves 36 and 37 intersecting in the centre in the axial direction. At the base of the receptacle 3 are provided mouldings of the same shape and in the same position as the grooves 36, so that the position of the grooves 37 relative to the grooves 36 can be fixed from above. When the grooves 36 and 37 coincide in the way shown in Figure 12, the feeding liquid can flow through each one groove 37 and 36. If, however, the friction cock 35 is turned so far that the grooves 36 and 37 no longer coincide, every passage from the receptacle 3 through its connecting piece 5 is stopped. Various continuously attainable control positions lie between these two extreme positions.

In Figure 13 is represented a similar regulating device to that shown in Figure 4, in which, however, the threaded part 18 of the adjusting bolt 19 engages in a threaded part 40 mounted by means of spokes 39 on the wall of the receptacle 3. The adjusting bolt 19 can be turned by an actuating knob 41 in order to reach the desired control position. The regulating device shown in Figure 13 can then also be used when the appliance is used as a sucking device together with the bottle.

The previously described devices have a certain disadvantage in that the cover 13 must be removed and kept separately when the appliance is used as a sucking device together with the bottle 1. It would therefore be desirable to provide a cover 13 which need not be removed when the appliance was used with the bottle 1. The requirement would then be, of course, that the cover 13 would be tightly closed when the appliance was used as a sucking bag and as a stopper for the bottle 1, and a preferably controllable passage would be allowed when it was used as a sucking device of the bottle. In order to embody these conditions, the receptacle 3 could be provided with an inside screw thread at its mouth into which the cover 13 could be screwed, without hindering the use as desired of the threaded parts 9*a* and 9*b*, and the device for regulating the flow or for stopping the flow would have to be built in to the cover itself. For this, for example, a suitable slide valve could be used similar to that shown in the Figures 7 and 8, or a friction valve according to that shown in Figures 11 and 12.

Instead of a screw thread divided into two parts by the flange 10, a single cylindrical screw thread could be provided on the receptacle 3, in which case a correspondingly arranged sealing ring in the bottle 1 and suitably arranged sealing faces on the casing 3 would have to be provided. If the bottle 1 consists of flexible, good sealing material of itself, then it could also be used without special sealing rings if the screw thread of the receptacle 3 were screwed sufficiently into the screw thread 2 of the bottle 1. Of course, a snap or bayonet fastening could also be provided.

It might also be possible always to use the appliance only in the position shown in Figure 1 together with the bottle 1, in which case, with the channel closed, it would act as a stopper for the bottle and, with the channel open, as a sucking device. It is thus sufficient if the appliance is capable of being placed in one position on the mouth of the bottle.

The receptacle 3 could also, of course, have another suitable shape. If sufficient of a seal exists between the disc 7 and the teat 6, the receptacle or reservoir 3 could be entirely omitted and the edge of the disc 7 be provided with a screw thread, in which case the disc 7 could be screwed into the bottle 1 in two opposite positions. There would then have to be present in addition a closing member for the channel 12, with which the appliance could be used as a closing member for the bottle and as a sucking bag which could not be filled.

As the enlarged sectional Figure 14 shows clearly, the wall of the bottle 1 has a thickening 42 with a dovetail groove 43, and a thermometer 44 is inserted in the latter. Approximately in the centre of the thickened part 42 there are provided laterally to the dovetail groove, e. g. rectangular recesses 45, in which cams 46 of the thermometer 44 engage and therefore specifically fix the axial position of the thermometer. Since the bottle consists of soft flexible material, the thermometer 44 can be inserted in the dovetail groove 43 by slight pressure and can be removed by a correspondingly slight pull outwards from the groove. A scale 47 is placed, e. g. pressed in, on the thickened part 42, i. e. on the outer wall of the bottle, and, having regard to the material of the bottle and the thickness of its wall, i. e. to the heat conduction of the bottle wall, is so calibrated that the thermometer 44 mounted on the outside of the bottle, which has no scale of its own, indicates directly the temperature obtaining in the bottle. It is therefore possible, when the same thermometer 44 is always used, to adjust the calibration of the scale 47 directly to the physical characteristics of the bottle when the bottle 1 is made.

Figure 15:
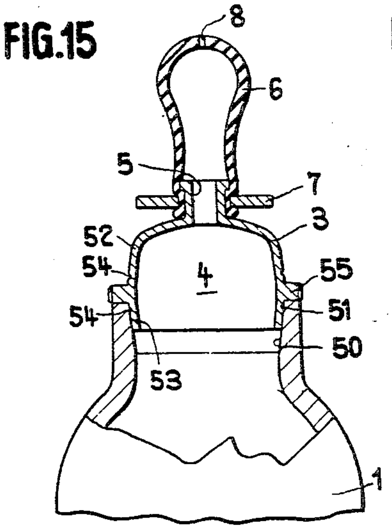
Figures 15 and 16 are illustrations similar to Figures 1 and 2 of another embodiment of the appliance.
Figure 16:
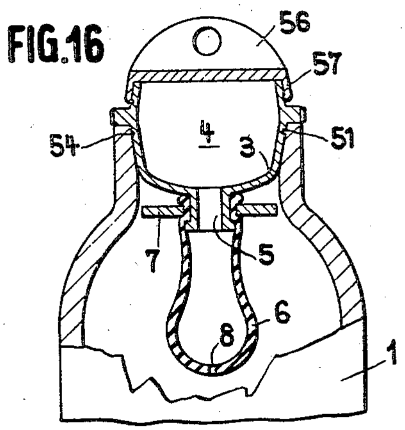

The appliance of Figures 15 and 16 is similar to the one illustrated in Figures 1 and 2, but the mouth of the feeding bottle 1 has an inside conical surface 50 having an annular bead 51 near its upper end. The receptacle 3 has two conical outer surfaces 52 and 53 having each an annular groove 54, the conical surfaces 52 and 53 being separated from each other by an annular flange 55.

The use of the appliance shown in Figures 15 and 16 is similar to the use of the appliance disclosed in Figures 1 and 2. As shown in Figure 15 the receptacle 3 may be inserted with its conical surface 53 into the conical portion 50 of the bottle mouth and is held in place by the frictional engagement of the conical surfaces 50 and 53 and by the engagement of the bead 51 in the groove 54. In this state the appliance may be used for feeding the child.

For transport of the feeding bottle 1 and the sucking portion the receptacle 3 is removed from the bottle and is reinserted into the bottle mouth in the position shown in Figure 16, whereby the conical surface 52 of the receptacle 3 will engage the conical surface of the bottle mouth. A cover 56 having a conical flange 57 may be attached to the conical surface 53 of the receptacle for closing it. In the state illustrated in Fig. 16 the sucking device may be used separate from the feeding bottle 1 as a fillable infant's pacifier.

Figure 17:
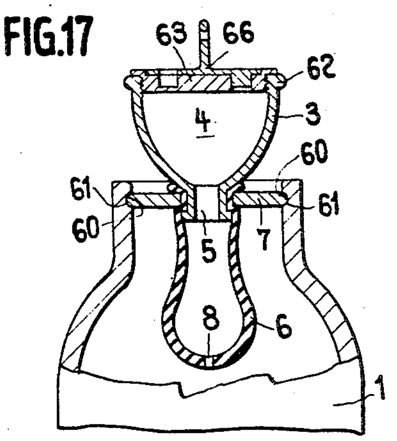
Figures 17 and 18 illustrate a further embodiment of the appliance.
Figure 18:
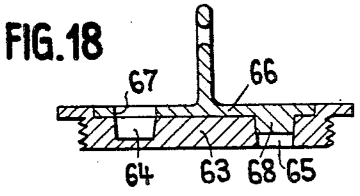

In the appliance of Figures 17 and 18 the cover of the receptacle 3 need not be removed for use of the sucking device with the bottle 1 for feeding the child. In this embodiment the disc 7 has a rounded sealing surface 60 adapted to engage an annular groove 61 at the inner surface of the bottle mouth in a manner to tightly seal the bottle mouth so that liquid cannot leak out of the bottle. The receptacle 3 has an annular bead 62 surrounding its opening and adapted to engage the annular groove 61 of the bottle mouth in the manner illustrated for the rounded surface 60 of the disc 7. A cover portion 63 having a dead hole 64 and a bore 65 may be screw fastened in a suitable screw thread of the receptacle opening as shown in Figure 17. The cover has a removable cover portion 66 having a bore 67 and a plug 68. The cover portion 66 may be removed from the cover portion 63 and may be attached to the cover portion 63 either in the position illustrated in Figures 17 and 18 in a manner that its plug 68 engages and tightly closes the bore 65 of the cover portion 66 or in another position for which the plug 68 engages the dead hole 64 whereas the bore 67 of the cover portion 66 covers with the bore 65 of the cover portion 63 thereby forming a passage in the cover through which a liquid substance may flow.

In the position illustrated in Figure 17 the bottle 1 is tightly closed by the disc 7 engaging the groove 61. The receptacle 3 is tightly closed by its cover 63, 66 which is in its closed state and therefore no leakage of the bottle contents is possible when the filled bottle is transported in this condition.

For feeding a child the sucking device is removed from the bottle mouth and the cover portion 66 is turned to its open position for which the passages 65 and 67 will cover and will allow flow of the bottle contents through the cover. The sucking device is then inserted into the mouth of the bottle so that the bead 62 engages the groove 61 of the bottle mouth, the teat 6 being directed outwards. When the appliance is used for feeding a child in this state the bottle contents will flow from the bottle 1 through the passages 65 and 67 of the cover portions 63 and 66, the hollow space 4 of the receptacle and the connecting piece into the teat from which the liquid may be sucked out by the child.

The appliance of Figures 17 and 18 has the advantage that it may be used for three purposes, viz: feeding the child with the bottle 1, closing the bottle 1 and as a fillable pacifier separate from the bottle, without removing the cover of the receptacle. Further the outside of the receptacle 3 is never exposed to the bottle contents and therefore handling of this appliance is a particularly clean one.

Figures 19, 20:
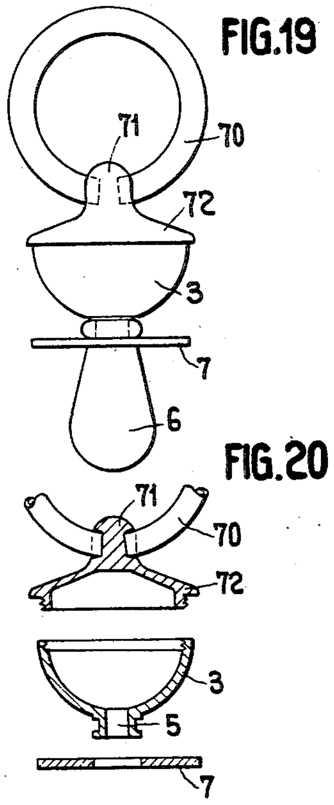
Figure 19 is a side view of another embodiment of the appliance ready for use as an infant's pacifier and Figure 20 is an exploded view of the embodiment shown in Figure 17.

Figures 19 and 20 illustrate a further embodiment of this invention particularly useful as a fillable pacifier shown in side view in Figure 19. The appliance according to Figures 19 and 20 differs from the preceding constructions in that a ring 70 is attached to a plug 71 of the cover 72 of the receptacle 3.

An essential advantage of the appliance described is that the teat 6 never has to be directly touched which very much facilitates the hygienic treatment of the sucking device.

While the invention has been described and illustrated with reference to specific embodiments thereof, it will be understood that other embodiments may be resorted to without departing from the invention. Therefore, the forms of the invention set out above should be considered as illustrative and not as limiting the scope of the following claims.

What we claim is:

1. An infant's pacifier for use with an infant's feeding bottle, comprising a bag-shaped teat of soft resilient material, a container having a connecting piece at one end and an opening at the other end, the said teat being attached to the said connecting piece of the container, the said container having a place of greatest diameter adjacent the said opening and an external screw thread at the said place of greatest diameter, a cover having an internal screw thread adapted to be engaged with the said external thread of the container for covering and closing the said container and the said cover being removable from the said container for filling a substance into the said container when the pacifier is to be used as a fillable pacifier, the said feeding bottle having a mouth with an internal screw thread, the external screw thread of the said container being engageable in two opposite positions with the internal screw thread of the mouth of the feeding bottle, a flow canal interconnecting the said container and the said teat, the said teat being directed outwardly from the said mouth of the feeding bottle for one of the said positions of the fixing member thereby allowing flow of the bottle contents through the said flow canal into the teat and the teat being directed into the bottle for the other of the said positions of the fixing member thereby constituting a closure for the said bottle when the said container is closed by the said cover.

2. An appliance for use with an infant's feeding bottle, comprising a sucking portion constituted by a teat and a fixing member, a sucking end on the said teat and a portion of the teat opposite the said sucking end, the said portion of the teat being attached to the said fixing member, a mouth on the said feeding bottle having an internal thread and an external thread at the place of greatest diameter of the said fixing member, the said external thread of the fixing member being adapted to be engaged with the said internal thread of the mouth of the feeding bottle in two opposite positions for attaching the said fixing member to the mouth of the feeding bottle in two opposite positions, a flow canal in the said sucking portion and means for closing the said flow canal, the said teat being directed outwardly from the said mouth of the feeding bottle for one of the said positions of the fixing member thereby allowing flow of the bottle contents through the said flow canal into the teat, and the teat being directed into the bottle for the other of the said positions of the fixing member constituting a closure for the said bottle when the said flow canal is closed by the said closing means.

3. An appliance according to claim 2, the screw thread being divided into two parts by means of an annular flange of larger diameter.

4. An appliance according to claim 2, a closing member independent of the sucking device being provided for the mouth of the bottle.

5. An appliance according to claim 2, characterised in that a cover for the opening of the container is so arranged that when in place it allows the sucking device to be placed on the bottle in both of the said opposite positions.

6. An appliance according to claim 2, means for closing the flow canal being provided which are constructed as a regulating member for regulating the flow through the flow canal.

7. An appliance according to claim 6, the regulating member being situated in the cover of the container.

8. An appliance according to claim 6, a slide bar adapted to be actuated from outside of the said container being displaceable transversely to the channel at one place of the latter.

9. An appliance according to claim 6, a friction cock being provided in order to regulate the flow.

10. An appliance according to claim 6, in which the teat is placed on a connecting piece of the container, the connecting piece having an outflow opening, a sleeve being placed movably between the teat and the connecting piece, for closing the outflow opening of the connecting piece.

11. An appliance according to claim 10, the sleeve being rotatable and having a base with an eccentric opening, an eccentric opening of the flow canal of the connecting piece cooperating with the said eccentric opening of the sleeve base for the purpose of adjusting the flow.

12. An appliance according to claim 10, the sleeve being axially displaceable on the connecting piece and having a bottom portion, adjustment of the flow being effected by regulation of the axial distance of the bottom portion of the sleeve from the outflow opening of the connecting piece.

13. An appliance according to claim 12, the sleeve fitting rotatably on the connecting piece and having an inclined guide slot, a guide cam of the connecting piece engaging the guide slot in such a way that the sleeve is axially displaced when rotated.

14. An appliance for use with an infant's feeding bottle, comprising a sucking portion constituted by a teat and a fixing member, a sucking end on the said teat and a portion of the teat opposite the said sucking end, the said portion of the teat being attached to the said fixing member, a mouth on the said feeding bottle having an internal conical surface and two oppositely tapered conical outer surfaces at the place of greatest diameter of the said fixing member, each of the said conical surfaces of the fixing member being adapted to be engaged with the said internal conical surface of the mouth of the feeding bottle thereby allowing attaching of the said fixing member to the mouth of the feeding bottle in two opposite positions according to whether the one or other of the said conical surfaces of the fixing member engages the conical surface of the opening of the bottle, a flow canal in the said sucking portion and means for closing the said flow canal, the said teat being directed outwardly from the said mouth of the feeding bottle for one of the said positions of the fixing member thereby allowing flow of the bottle contents through the said flow canal into the teat, and the teat being directed into the bottle for the other of the said positions of the fixing member thereby constituting a closure for the said bottle when the said flow canal is closed by the said closing means.

References Cited in the file of this patent

UNITED STATES PATENTS 2,357,477 Killman ---------------- Sept. 5, 1944

FOREIGN PATENTS 11,689 Great Britain ------------ June 22, 1892

11,189 Great Britaiin ----------- May 10, 1912